United States Patent
Luo et al.

(10) Patent No.: US 12,116,478 B2
(45) Date of Patent: Oct. 15, 2024

(54) ECONOMICAL EPOXY RESIN MATERIAL FOR EPOXY ASPHALT WITH LOW-TEMPERATURE RESISTANCE AND HIGH FLEXIBILITY AS WELL AS PREPARATION METHOD THEREOF

(71) Applicant: Southeast University, Suzhou (CN)

(72) Inventors: Sang Luo, Suzhou (CN); Jing Hu, Suzhou (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 18/335,100

(22) Filed: Jun. 14, 2023

(65) Prior Publication Data
US 2023/0407083 A1      Dec. 21, 2023

(30) Foreign Application Priority Data

Jun. 16, 2022  (CN) .......................... 202210686958.5

(51) Int. Cl.
| | |
|---|---|
| *C08L 63/00* | (2006.01) |
| *C04B 24/28* | (2006.01) |
| *C08J 3/20* | (2006.01) |
| *C08K 5/098* | (2006.01) |
| *C08K 5/17* | (2006.01) |
| *C08K 5/3462* | (2006.01) |
| *C04B 111/00* | (2006.01) |

(52) U.S. Cl.
CPC ............ *C08L 63/00* (2013.01); *C04B 24/281* (2013.01); *C08J 3/203* (2013.01); *C08K 5/098* (2013.01); *C08K 5/17* (2013.01); *C08K 5/3462* (2013.01); *C04B 2111/0075* (2013.01); *C08J 2363/00* (2013.01)

(58) Field of Classification Search
CPC ................... C08L 63/00; C04B 24/281; C04B 2111/0075; C08J 3/203; C08J 2363/00; C08K 5/09; C08K 5/17; C08K 5/3462; C08K 5/098
USPC ......................................................... 525/507
See application file for complete search history.

(56) References Cited

U.S. PATENT DOCUMENTS

2020/0140689 A1*    5/2020  Osaki ...................... C08L 23/06

FOREIGN PATENT DOCUMENTS

| CN | 104059591 | 9/2014 |
|---|---|---|
| CN | 104830030 | 8/2015 |
| CN | 105017726 | 11/2015 |
| CN | 114044882 | 2/2022 |

OTHER PUBLICATIONS

Chen et al., CN 114044882 A machine translation in English, Feb. 15, 2022. (Year: 2022).*

* cited by examiner

*Primary Examiner* — David T Karst
(74) *Attorney, Agent, or Firm* — JCIPRNET

(57) ABSTRACT

The present disclosure discloses an economical epoxy resin material for epoxy asphalt with low-temperature resistance and high flexibility as well as a preparation method thereof. The material comprises 60 parts of an epoxy resin main agent, 0.4 parts to 1.6 parts of a modifying gent, 31 parts to 36.5 parts of an active curing agent, 0.5 parts to 1.5 parts of a titanate coupling agent, and 1.6 parts to 6.4 parts of a reversible deformation additive.

5 Claims, 1 Drawing Sheet

(a) before curing (b) after curing (a) before curing　　　(b) after curing

# ECONOMICAL EPOXY RESIN MATERIAL FOR EPOXY ASPHALT WITH LOW-TEMPERATURE RESISTANCE AND HIGH FLEXIBILITY AS WELL AS PREPARATION METHOD THEREOF

CROSS-REFERENCE TO RELATED APPLICATION

This application claims the priority benefit of China application serial no. 202210686958.5, filed on Jun. 16, 2022. The entirety of the above-mentioned patent application is hereby incorporated by reference herein and made a part of this specification.

TECHNICAL FIELD

The present disclosure belongs to the technical field of high polymer materials and preparation thereof, and specifically relates to an economical epoxy resin material for epoxy asphalt with low-temperature resistance and high flexibility and a preparation method thereof.

BACKGROUND

In recent years, the traffic field in China is rapidly developed, the Chinese traffic volume is greatly increased, and the general promotion of the road grade puts higher requirements on the asphalt pavement; the bridge serves as a junction facility for connecting traffic and the functions exerted in a traffic network are increasingly irreplaceable, so that the requirements on bridge deck pavement are stricter. At present, the materials for paving the asphalt pavement and the steel bridge pavement are mainly gussasphalt mixture, epoxy asphalt mixture, stone mastic asphalt mixture and the like. The epoxy asphalt mixture is applied to a plurality of large-span steel bridges such as Hangzhou Bay Railway Bridge, Wuhan Tianxingzhou Yangtse Bridge due to the characteristics of excellent deformation resistance, water stability, fatigue resistance and the like.

However, epoxy asphalt generally has the disadvantages of poor low-temperature flexibility, poor deformation compatibility with steel bridge pavement, and generation of large temperature stress and fatigue cracks under low-temperature conditions. Although the toughening agent is currently used for improving the flexibility of the epoxy asphalt, the effect is not satisfactory, and the cracks have become the most common diseases in the epoxy asphalt bridge deck pavement, so the normal use and the driving safety of the bridge are influenced. At present, the existing invention patents in China and abroad propose some epoxy system preparation processes for improving poor low-temperature flexibility, but all have the defects of various raw materials and complex preparation processes, and break away from the practical construction.

In the using process of epoxy asphalt, a certain construction time, also called retention time, needs to be reserved for the epoxy asphalt and the aggregate to be convenient for mixing and paving. At present, the related technology in China and abroad is currently to increase the retention time by adding a diluent into the system, and the excessive addition of diluent can forcibly reduce the viscosity and increase the retention time. However, the mechanical property of the curing system is influenced, and the method is not the best of both worlds.

In addition, because the physical and chemical properties of petroleum asphalt and epoxy resin are greatly different, an epoxy resin system synthesized by applying most of the conventional epoxy resin curing agents is poor in compatibility with asphalt, a fully-crosslinked network structure cannot be formed in the epoxy asphalt, an obvious two-phase separation occurs, a stripping phenomenon is caused, and the normal use of a pavement and a deck is influenced. Moreover, the imported epoxy resin and the matched curing agent thereof are widely applied to the paving of asphalt pavements and steel bridge pavements in China at present by virtue of excellent flexibility. However, the high price greatly increases the cost of paving materials and further hinders the popularization of epoxy asphalt pavements.

Therefore, how to develop an epoxy resin system that has good compatibility with asphalt, low cost, simple raw material and preparation process, long retention time and can be used for preparing low-temperature high-flexibility epoxy asphalt material is a problem to be solved urgently in the field of traffic infrastructure.

SUMMARY

The present disclosure provides the epoxy resin material which has low cost, simple preparation process, good compatibility with asphalt and long retention time, and can be used for preparing the low-temperature high-flexibility epoxy asphalt material, so as to effectively reduce the occurrence frequency of crack diseases of bridge deck pavement, greatly reduce the capital investment of bridge deck pavement engineering and improve the economic benefit.

The present disclosure are as follows.

Provided is an economical epoxy resin material for epoxy asphalt with low-temperature resistance and high flexibility. The material comprises the following components by a mass fraction.

The material comprises a component A and a component B.

The component A includes 60 parts of an epoxy resin main agent.

The component B includes as follows.

0.4 parts to 1.6 parts of a modifying agent.

31 parts to 36.5 parts of an active curing agent.

0.5 parts to 1.5 parts of a titanate coupling agent.

1.6 parts to 6.4 parts of a reversible deformation additive.

The modifying agent, the active curing agent, the titanate coupling agent and the reversible deformation additive in component B have a synergistic effect.

The epoxy resin main agent is selected from any one or a mixture of China-made diphenol propane glycidyl ether resin and diphenol methane glycidyl ether resin; preferably a China-made diphenol propane glycidyl ether resin.

Specifically, the modifying agent is selected from any one or a mixture of more than two from 1,8-diamino-p-menthane, 1-piperazine ethylamine, 4,4'-diaminodicyclohexylmethane and 1,3-bis (aminomethyl) cyclohexane, and preferably 1-piperazine ethylamine. The modifying agent is an amine compound containing an amine ring (cyclohexyl, hetero-oxygen and nitrogen atom six-membered ring) in a molecular structure, is a low-viscosity liquid, is used for modifying the active curing agent in the present disclosure, and participates in the curing reaction of the epoxy resin together, so that the viscosity of the epoxy asphalt can be reduced, and the low-temperature property of the epoxy asphalt is improved.

Specifically, the active curing agent is selected from any one or a mixture of more than two from coco alkyl amine,`

1-amino-9-octadecene, oleyl amine polyoxyethylene ether and lauroyl glutamic acid, and preferably 1-amino-9-octadecene.

Specifically, the titanate coupling agent is selected from any one or a mixture of more than two from isopropyl triisostearoyl titanate, isopropyl trilauryl titanate, isopropyl tris (dodecylbenzenesulfonyl) titanate and isopropyl isostearoyl diacryloyl titanate, and preferably isopropyl triisostearoyl titanate. The inorganic functional group of the titanate coupling agent has only one alkoxy, and the organic functional group Y at the other end is consist of C=C, $NH_2$, OH, and H. Moreover, the interface of the active curing agent in the present disclosure is modified by halogen group elements and organic hydroxyl groups, both of which participate in the curing reaction of the epoxy resin, reducing the viscosity of the cured epoxy resin when preparing epoxy asphalt with asphalt, increasing construction tolerance time, improving workability, and reducing production costs.

Specifically, the reversible deformation additive is selected from any one or a mixture of more than two from acrylonitrile-butadiene rubber, fluorine rubber, liquid acrylate rubber and liquid phenolic resin, and preferably the acrylonitrile-butadiene rubber. The epoxy resin generated after the curing reaction of the active curing agent and the epoxy resin main agent in the present disclosure is a thermosetting resin, so the epoxy resin has high strength but low flexibility and particularly shows the characteristics of hardness and brittleness under low-temperature conditions.

The reversible deformation additive has an affinity with epoxy resin, which can form a rubber particle dispersion phase, and forms a "sea-island structure" together with the epoxy resin phase, and elastomer particles in the dispersion phase stop crack generation when a system is impacted, so that shear deformation is induced, and the flexibility of the epoxy resin and the epoxy asphalt in the present disclosure under normal temperature and low-temperature conditions is improved.

Further, the present disclosure also provides a method for preparing the economical epoxy resin material for epoxy asphalt with low-temperature resistance and high flexibility. The method comprises the following steps.

(1) The active curing agent, the modifying agent, the titanate coupling agent and the reversible deformation additive are mixed, the mixture is preheated to 60° C., and the mixture is stirred and mixed to obtain the component B.

(2) The component B obtained in Step (1) and the component A are mixed with each other, and the mixture is stirred for 5 minutes at a temperature of 60±5° C. to obtain the epoxy resin material.

Preferably, in Step (1), the stirring temperature for preparing the component B is 80±5° C. and the stirring time is 3 hours.

Furthermore, the present disclosure also claims a use of the epoxy resin material in preparing an epoxy asphalt for paving highway pavement, concrete bridge pavement and steel bridge pavement.

Specifically, the method includes the following steps.

In S1, components A and B in the epoxy resin material are evenly mixed.

In S2, 100 parts of the epoxy resin material obtained by mixing in Step S1 are taken and added into 100 parts of a matrix asphalt. The mixture is stirred at a temperature of 160±10° C. for minutes to obtain the epoxy asphalt.

In S3, the epoxy asphalt obtained in Step S2 is mixed with aggregate and mineral powder, and the mixture is stirred for 1 minute to 2 minutes at a temperature of 170±10° C. to obtain an epoxy asphalt mixture; a mass percent of the epoxy asphalt is 4% to 6%, and a mass percent of the aggregate and the mineral powder is 94% to 96%.

In S4, the epoxy asphalt mixture obtained in Step S3 is spread on the pavement or the deck, the epoxy asphalt mixture is rolled into shape, and the shaped epoxy asphalt mixture is cured at a temperature of 5° C. to 50° C. for 36 hours to 96 hours to obtain the pavement and deck paved by the economic epoxy asphalt with low-temperature resistance and high flexibility.

(1) The epoxy resin material of the present disclosure can be fully crosslinked in asphalt to form a uniformly dispersed three-dimensional network structure, exhibiting good compatibility, as illustrated in FIG. 1. Through the cross-linking and curing reaction between the epoxy group of epoxy resin and the curing agent, epoxy asphalt forms a stable two-phase system, where epoxy resin is a continuous phase and matrix asphalt is a dispersed phase. The irreversible cross-linking network of epoxy resin greatly limits the fluidity of asphalt molecules, which completely changes the thermoplastic properties of asphalt and endows epoxy asphalt with the characteristics of thermosetting elastomers. In addition, the addition of active curing agents with compatibilization and dispersion effects to the epoxy resin material enhances the long-term phase stability of epoxy asphalt. The Marshall stability of the epoxy asphalt mixture prepared by mixing with mineral materials is as high as 50.82 kN, indicating that the mixture has superior strength and stability.

(2) The epoxy resin material in the present disclosure contains reversible deformation additives, which enables the prepared epoxy asphalt to have extremely strong tensile properties, especially exhibiting excellent flexibility and tensile strength in low-temperature environments. After tensile testing, it is proved that the epoxy asphalt prepared using the epoxy system in the present disclosure has a better tensile strength and elongation at break at −10° C. compared to commonly used China-made epoxy asphalt and high-property Japanese epoxy asphalt.

(3) The epoxy resin material of the present disclosure contains a titanate-type coupling agent, which reduces the viscosity of the resin mixture, prolongs the retention time of the prepared epoxy asphalt, facilitates the mixing and paving of epoxy asphalt and aggregates, and satisfies the construction requirements. Taking Example 1 as an example, viscosity tests are conducted using the epoxy asphalt in Example 1 at 160° C. and 180° C., and the viscosity curve is illustrated in FIG. 2. The viscosity of this epoxy asphalt remains below 1000 mPa·s within 150 minutes, satisfying the requirements of the specification that the time for viscosity to reach 1000 mPa·s is more than minutes.

(4) The epoxy resin material of the present disclosure adopts China-made diphenol propane glycidyl ether resin or diphenol methane glycidyl ether resin, which has a much lower cost than the epoxy resin system prepared by a high-property Japanese epoxy resin and matched curing agents thereof and American epoxy asphalt. The epoxy resin material of the present disclosure is used to prepare epoxy asphalt, which has a simple preparation process and is practical and convenient for construction.

BRIEF DESCRIPTION OF THE DRAWINGS

The above and/or other advantages of the present disclosure will become further apparent from the following detailed description of the present disclosure in conjunction with the accompanying drawings and the embodiments.

DETAILED DESCRIPTION OF THE EMBODIMENTS

The present disclosure will be better understood from the following examples.

Example 1

The material composition is as follows.

Asphalt: 100 parts of 70 # road petroleum asphalt.

Component A: 60 parts of China-made diphenol propane glycidyl ether resin.

Component B: 0.4 parts of modifying agent (1-piperazine ethylamine, Jining Sanshi Biotechnology Co., Ltd.), 36.5 parts of active curing agent (1-amino-9-octadecene, Condicechem HuBei), 1.5 parts of titanate coupling agent (isopropyl triisostearoyl titanate, Shandong Linchuang Biotechnology), and 1.6 parts of reversible deformation additive (acrylonitrile-butadiene rubber, in HuBei ChengFeng Chemical Co., Ltd.).

A method for preparing an epoxy asphalt of Example 1 includes the following steps. A modifying agent, an active curing agent, a titanate coupling agent and a reversible deformation additive that are preheated to 60° C. are added into a flask, and stirred for 3 hours at 80° C. to synthesize a component B; the synthesized component B is mixed with the component A and stirred at the temperature of 60±5° C. for 5 minutes to obtain an epoxy resin system. The prepared epoxy resin system is added into 70 # road petroleum asphalt and stirred for 5 minutes at the temperature of 160±5° C. to obtain the epoxy asphalt.

Figure 1:
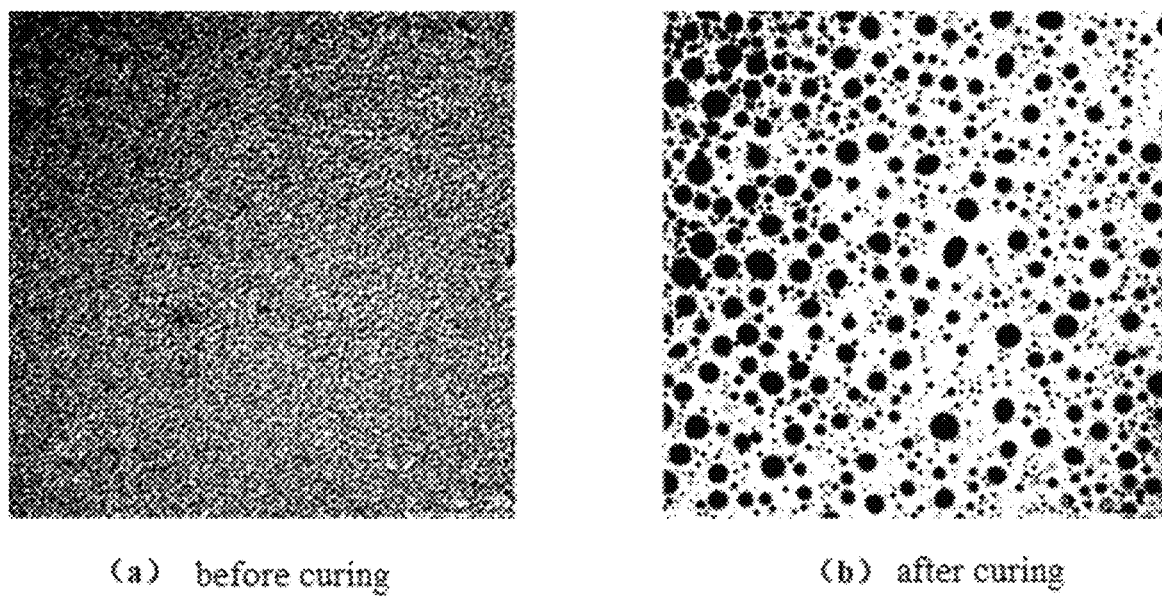
FIG. 1 illustrates fluorescence microscopy images (10×) of an epoxy asphalt prepared by using an epoxy resin material of the present disclosure before and after curing.

FIG. 1 illustrates fluorescent microscopic images of an epoxy asphalt prepared from an epoxy resin material of Example 1 before and after curing. It can be seen from FIG. 1 that, before curing, the components of the epoxy asphalt are subjected to sufficient high-speed shearing and stirring to maintain the dispersion among the particles so that the asphalt appears as a continuous phase under fluorescent irradiation, and the epoxy resin appears as dispersed particles; after the curing reaction, the epoxy resin is converted into a continuous phase and forms a stable and compact cross-linked network structure, as a disperse phase, the asphalt is embedded with the epoxy resin in spherical particles, the area of the fluorescent part in the image is calculated using threshold segmentation method, and the proportion of epoxy resin area is 60.89%. It is verified that the three-dimensional network formed by epoxy resin curing and crosslinking at this time is dense and stable, and epoxy asphalt has more stable mechanical properties.

Figure 2:
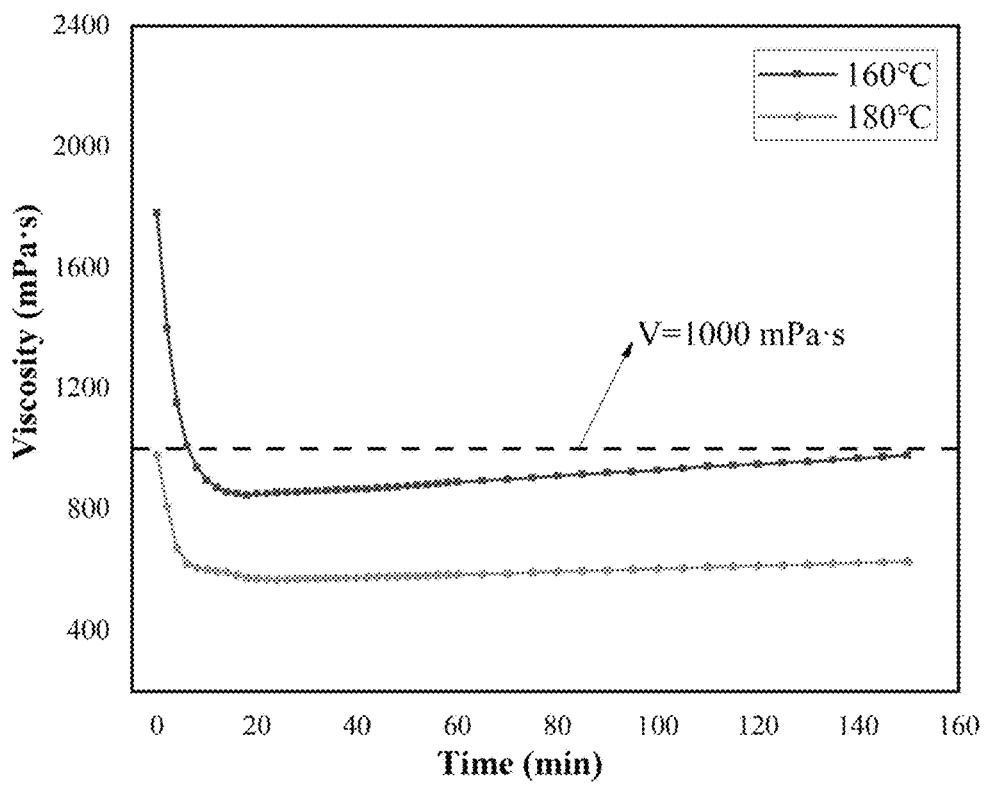
FIG. 2 illustrates Brookfield viscosity curves for an epoxy asphalt in Example 1 at 160° C. and 180° C.

FIG. 2 illustrates Brookfield viscosity curves for an epoxy asphalt in Example 1 at 160° C. and 180° C. As illustrated in FIG. 1, the viscosity of the epoxy asphalt in Example 1 is permanently lower than 1000 mPa·s within 150 minutes, which satisfies the requirement for the specification: the time for the viscosity to reach 1000 mPa·s is more than 50 minutes. This epoxy asphalt is proved to have a long retention time, be convenient for mixing and paving the epoxy asphalt and aggregate, and satisfy the construction requirements.

Example 2

The material composition is as follows.

Asphalt: 100 parts of 70 # road petroleum asphalt.

Component A: 60 parts of China-made diphenol propane glycidyl ether resin.

Component B: 0.8 parts of modifying agent (1-piperazineethylamine, Jining Sanshi Biotechnology Co., Ltd.), 34.8 parts of active curing agent (1-amino-9-octadecene, Condicechem HuBei), 1.2 parts of titanate coupling agent (isopropyl triisostearoyl titanate, Shandong Linchuang Biotechnology), and 3.2 parts of reversible deformation additive (acrylonitrile-butadiene rubber, HuBei ChengFeng Chemical Co., Ltd.).

The preparation method of epoxy asphalt in Example 2 is the same as in Example 1.

Example 3

The material composition is as follows.

Asphalt: 100 parts of 70 # road petroleum asphalt.

Component A: 60 parts of China-made diphenol propane glycidyl ether resin.

Component B: 1.2 parts of modifying agent (1-piperazine ethylamine, Jining Sanshi Biotechnology Co., Ltd.), 33.2 parts of active curing agent (1-amino-9-octadecene, Condicechem HuBei), 0.8 parts of titanate coupling agent (isopropyl triisostearoyl titanate, Shandong Linchuang Biotechnology), and 4.8 parts of reversible deformation additive (acrylonitrile-butadiene rubber, HuBei ChengFeng Chemical Co., Ltd.).

The preparation method of epoxy asphalt in Example 3 is the same as in Example 1.

Example 4

The material composition is as follows.

Asphalt: 100 parts of 70 # road petroleum asphalt.

Component A: 60 parts of China-made diphenol propane glycidyl ether resin.

Component B: 1.6 parts of modifying agent (1-piperazine ethylamine, Jining Sanshi Biotechnology Co., Ltd.), 31.5 parts of active curing agent (1-amino-9-octadecene in Condicechem HuBei), 0.5 parts of titanate coupling agent (isopropyl triisostearoyl titanate, Shandong Linchuang Biotechnology), and 6.4 parts of reversible deformation additive (acrylonitrile-butadiene rubber, HuBei ChengFeng Chemical Co., Ltd.).

The preparation method of epoxy asphalt in Example 4 is the same as in Example 1.

Comparative Example 1

The material composition is as follows.

Asphalt: 100 parts of 70 # road petroleum asphalt.

Component A: 50 parts of China-made diphenol propane glycidyl ether resin.

Component B: 50 parts of polyamine curing agent (Polyethylene Polyamine, Shandong Xuguang Chemical Co., Ltd.).

A method for preparing an epoxy asphalt of Comparative Example 1 includes the following steps. The component A and the component B preheated to 60° C. are mixed with each other and stirred for 5 minutes at the temperature of 60±5° C. to obtain an epoxy resin system; the prepared epoxy resin system is added into 70 # road petroleum asphalt and stirred for 5 minutes at the temperature of 160±5° C. to obtain the epoxy asphalt.

Comparative Example 2

The material composition is as follows.
Asphalt: 100 parts of 70 # road petroleum asphalt.
Component A: 40 parts of China-made diphenol propane glycidyl ether resin.
Component B: 30 parts of polyether amine D230 curing agent and 30 parts of m-xylylenediamine curing agent.

A method for preparing an epoxy asphalt in Comparative Example 2 includes the following steps. The 70 # road petroleum asphalt, the polyether amine D230 curing agent and the m-xylylenediamine curing agent are uniformly stirred through a colloid mill, then the component A is added, uniformly mixed, and cured at the temperature of 60° C. for 12 hours to obtain the epoxy asphalt.

Comparative Example 3

The material composition is as follows.
Asphalt: 100 parts of 70 # road petroleum asphalt.
Component A: 61 parts of Japanese epoxy resin KD-HDP.
Component B: 39 parts of epoxy resin curing agent matched with KD-HDP.

A method for preparing an epoxy asphalt of Comparative Example 3 includes the following steps. The component A and the component B preheated to 60° C. are mixed with each other and stirred for 5 minutes at the temperature of 60±5° C. to obtain an epoxy resin system; the prepared epoxy resin system is added into 70 # road petroleum asphalt and stirred for 5 minutes at the temperature of 160±5° C. to obtain the epoxy asphalt.

Comparative Example 4

The material composition is as follows.
Component A: 100 parts of American epoxy asphalt.
Component B: 416 parts of American epoxy asphalt.

A method for preparing an epoxy asphalt of Comparative Example 4 includes the following steps. The component A preheated to 90° C. is mixed with the component B preheated to 130° C., and stirred for 5 minutes at the temperature of 80±5° C. to obtain the epoxy asphalt.

Examples 1 to 4 are epoxy asphalts prepared by adopting the epoxy resin materials of the present disclosure; Comparative Examples 1 and 2 are epoxy asphalt prepared by using China-made epoxy resin and a common curing agent; Comparative Example 3 is an epoxy asphalt prepared using a high property Japanese epoxy resin and a mating curing agent; Comparative Example 4 is an American two-part epoxy asphalt. For the convenience of discussion, in the following description, the epoxy asphalts in Examples 1 to 4 are referred to as the epoxy asphalt of the present disclosure, the epoxy asphalt in Comparative Example 1 is referred to as the commonly-used China-made epoxy asphalt-1, the epoxy asphalt in Comparative Example 2 is referred to as the commonly-used China-made epoxy asphalt-2, the epoxy asphalt in Comparative Example 3 is referred to as the Japanese epoxy asphalt, and the epoxy asphalt in Comparative Example 4 is referred to as the American epoxy asphalt. The tensile strength and elongation at break at −10° C. and 23° C. of Examples 1 to 4 and Comparative Examples 1 to 4 are shown in Table 1.

TABLE 1

Summary Table of Tensile Property Results for Examples and Comparative Examples

| Tensile property test | −10° C. | | 23° C. | |
|---|---|---|---|---|
| | Tensile strength/MPa | Elongation at break/% | Tensile strength/MPa | Elongation at break/% |
| Example 1 | 7.73 | 43.58 | 5.15 | 182.74 |
| Example 2 | 9.32 | 39.03 | 5.87 | 162.68 |
| Example 3 | 9.18 | 41.67 | 6.12 | 134.57 |
| Example 4 | 8.57 | 48.14 | 5.91 | 159.78 |
| Comparative Example 1 | 6.51 | 14.58 | 4.53 | 79.64 |
| Comparative Example 2 | 11.54 | 15.75 | 9.89 | 90.52 |
| Comparative Example 3 | 9.14 | 31.48 | 7.21 | 193.32 |
| Comparative Example 4 | 5.28 | 53.28 | 3.57 | 220.75 |

The cost of each epoxy asphalt is converted, and the results are shown in Tables 2 to 9.

TABLE 2

Cost Table for Epoxy Asphalt in Example 1

| Example 1 (1t) | Species | Unit price (yuan/t) | Part (t) | Cost (yuan) |
|---|---|---|---|---|
| Asphalt | SK-70# road petroleum asphalt | 3650 | 0.5 | 1825 |
| Ether resin | Phoenix diphenol propane glycidyl ether resin | 26500 | 0.3 | 7950 |
| Modifying agent | 1-piperazine ethylamine, Jining Sanshi Biotechnology Co., Ltd. | 35000 | 0.002 | 70 |
| Active curing agent | 1-amino-9-octadecene, Condicechem HuBei | 25000 | 0.1825 | 4562.5 |
| Titanate coupling agent | Titanate coupling agent, Shandong Linchuang Biotechnology | 24000 | 0.0075 | 180 |
| Reversible deformation additive | Acrylonitrile-butadiene rubber, in HuBei ChengFeng Chemical Co., Ltd. | 10000 | 0.008 | 80 |
| Total (yuan) | | | | 14667.5 |

TABLE 3

Cost Table for Epoxy Asphalt in Example 2

| Example 2 (1t) | Species | Unit price (yuan/t) | Parts (t) | Cost (yuan) |
|---|---|---|---|---|
| Asphalt | SK-70# road petroleum asphalt | 3650 | 0.5 | 1825 |
| Ether resin | Phoenix 1-piperazine ethylamine, Jining Sanshi Biotechnology Co., Ltd. | 26500 | 0.3 | 7950 |
| Modifying agent | 1-piperazine ethylamine, Jining Sanshi Biotechnology Co., Ltd. | 35000 | 0.004 | 140 |
| Active curing agent | 1-amino-9-octadecene, Condicechem HuBei | 25000 | 0.174 | 4350 |
| Titanate coupling agent | Titanate coupling agent, Shandong Linchuang Biotechnology | 24000 | 0.006 | 144 |
| Reversible deformation additive | Acrylonitrile-butadiene rubber, in HuBei ChengFeng Chemical Co., Ltd. | 10000 | 0.016 | 160 |
| Total (yuan) | | | | 14569 |

TABLE 4

Cost Table for Epoxy Asphalt in Example 3

| Example 3 (1t) | Species | Unit price (yuan/t) | Part (t) | Cost (yuan) |
|---|---|---|---|---|
| Asphalt | 70# road petroleum asphalt | 3650 | 0.5 | 1825 |
| Ether resin | Phoenix diphenol propane glycidyl ether resin | 26500 | 0.3 | 7950 |
| Modifying agent | 1-piperazine ethylamine, Jining Sanshi Biotechnology Co., Ltd. | 35000 | 0.006 | 210 |
| Active curing agent | 1-amino-9-octadecene, Condicechem HuBei | 25000 | 0.166 | 4150 |
| Titanate coupling agent | Titanate coupling agent, Shandong Linchuang Biotechnology | 24000 | 0.004 | 96 |
| Reversible deformation additive | Acrylonitrile-butadiene rubber, in HuBei ChengFeng Chemical Co., Ltd. | 10000 | 0.024 | 240 |
| Total (yuan) | | | | 14471 |

TABLE 5

Cost Table for Epoxy Asphalt in Example 4

| Example 4 (1t) | Species | Unit price (yuan/t) | Part (t) | Cost (yuan) |
|---|---|---|---|---|
| Asphalt | SK-70# road petroleum asphalt | 3650 | 0.5 | 1825 |
| Ether resin | Phoenix diphenol propane glycidyl ether resin | 26500 | 0.3 | 7950 |
| Modifying agent | 1-piperazine ethylamine, Jining Sanshi Biotechnology Co., Ltd. | 35000 | 0.008 | 280 |
| Active curing agent | 1-amino-9-octadecene, Condicechem HuBei | 25000 | 0.1575 | 3937.5 |
| Titanate coupling agent | Titanate coupling agent, Shandong Linchuang Biotechnology | 24000 | 0.0025 | 60 |
| Reversible deformation additive | Acrylonitrile-butadiene rubber, in HuBei ChengFeng Chemical Co., Ltd. | 10000 | 0.032 | 320 |
| Total (yuan) | | | | 14372.5 |

TABLE 6

Cost Table for Epoxy Asphalt in Comparative Example 1

| Comparative Example 1 (1t) | Species | Unit price (yuan/t) | Part (t) | Cost (yuan) |
|---|---|---|---|---|
| Asphalt | SK-70# road petroleum asphalt | 3650 | 0.5 | 1825 |
| Ether resin | Phoenix diphenol propane glycidyl ether resin | 26500 | 0.25 | 6625 |
| Polyamine curing agent | Polyethylene Polyamine, Shandong Xuguang Chemical Co., Ltd. | 18000 | 0.25 | 4500 |
| Total (yuan) | | | | 12950 |

TABLE 7

Cost Table for Epoxy Asphalt in Comparative Example 2

| Comparative Example 2 (1t) | Species | Unit price (yuan/t) | Part (t) | Cost (yuan) |
|---|---|---|---|---|
| Asphalt | SK-70# road petroleum asphalt | 3650 | 0.5 | 1825 |
| Ether resin | Phoenix diphenol propane glycidyl ether resin | 26500 | 0.20 | 5300 |
| Polyether amine D230 | Polyether amine D230, Shandong Xincheng Chemical Co. Ltd. | 30000 | 0.15 | 4500 |
| m-xylylenediamine | m-xylylenediamine Shandong Duoju Chemical Co. Ltd. | 80000 | 0.15 | 12000 |
| Total (yuan) | | | | 23625 |

TABLE 8

Cost Table for Epoxy Asphalt in Comparative Example 3

| Comparative Example 3 (1t) | Species | Unit price (yuan/t) | Part (t) | Cost (yuan) |
|---|---|---|---|---|
| Asphalt | SK-70# road petroleum asphalt | 3650 | 0.5 | 1825 |
| Ether resin | Japanese epoxy resin KD-HDP | 135000 | 0.5 | 67500 |
| Active curing agent | Epoxy resin curing agent matched with KD-HDP | | | |
| Total (yuan) | | | | 69325 |

TABLE 9

Cost Table for Epoxy Asphalt in Comparative Example 4

| Comparative Example 4 (1t) | Species | Unit price (yuan/t) | Part (t) | Cost (yuan) |
|---|---|---|---|---|
| American epoxy asphalt A | American Chemical Corporation | 71500 | 1 | 71500 |
| American epoxy asphalt B | | | | |
| Total (yuan) | | | | 71500 |

Comparative Example 5

In order to verify that the modifying agent, the active curing agent, the titanate coupling agent and the reversible deformation additive in the epoxy resin material for epoxy asphalt have a synergistic effect, the above synergistic effect is illustrated by experimental groups 5-1, 5-2, 5-3, 5-5, 5-6, 5-7 and 5-8, respectively, and the components are as follows.

Experimental Group 5-1.
  Asphalt: 100 parts of 70 # road petroleum asphalt.
  Component A: 60 parts of China-made diphenol propane glycidyl ether resin.
  Component B: 40 parts of active curing agent (1-amino-9-octadecene, Condicechem HuBei).

Experimental Group 5-2.
  Asphalt: 100 parts of 70 # road petroleum asphalt.
  Component A: 60 parts of China-made diphenol propane glycidyl ether resin.
  Component B: 40 parts of modifying agent (1-piperazine ethylamine, Dining Sanshi Biotechnology Co., Ltd.).

Experimental Group 5-3.
  Asphalt: 100 parts of 70 # road petroleum asphalt.
  Component A: 60 parts of China-made diphenol propane glycidyl ether resin.
  Component B: 40 parts of Titanate coupling agent (isopropyl triisostearoyl titanate, Shandong Linchuang Biotechnology).
Experimental Group 5-4.
  Asphalt: 100 parts of 70 # road petroleum asphalt.
  Component A: 60 parts of China-made diphenol propane glycidyl ether resin.
  Component B: 40 parts of reversible deformation additive (acrylonitrile-butadiene rubber, in HuBei ChengFeng Chemical Co., Ltd.).
Experimental Group 5-5.
  Asphalt: 100 parts of 70 # road petroleum asphalt.
  Component A: 60 parts of China-made diphenol propane glycidyl ether resin.
  Component B: 0.9 parts of modifying agent (1-piperazine ethylamine, Dining Sanshi Biotechnology Co., Ltd.), and 39.1 parts of active curing agent (1-amino-9-octadecene, Condicechem HuBei).
Experimental Group 5-6.
  Asphalt: 100 parts of 70 # road petroleum asphalt.
  Component A: 60 parts of China-made diphenol propane glycidyl ether resin.
  Component B: 38.7 parts of active curing agent (1-amino-9-octadecene, Condicechem HuBei), and 1.3 parts of Titanate coupling agent (isopropyl triisostearoyl titanate, Shandong Linchuang Biotechnology).
Experimental Group 5-7.
  Asphalt: 100 parts of 70 # road petroleum asphalt.
  Component A: 60 parts of China-made diphenol propane glycidyl ether resin.
  Component B: 36.6 parts of active curing agent (1-amino-9-octadecene, Condicechem HuBei) and 3.4 parts of reversible deformation additive (acrylonitrile-butadiene rubber, in HuBei ChengFeng Chemical Co., Ltd.).
Experimental Group 5-8.
  Asphalt: 100 parts of 70 # road petroleum asphalt.
  Component A: 60 parts of China-made diphenol propane glycidyl ether resin.
  Component B: 0.8 parts of modifying agent (1-piperazine ethylamine, Dining Sanshi Biotechnology Co., Ltd.), 34.8 part of active curing agent (1-amino-9-octadecene, Condicechem HuBei), 1.2 parts of Titanate coupling agent (isopropyl triisostearoyl titanate, Shandong Linchuang Biotechnology), and 3.2 parts of reversible deformation additive (acrylonitrile-butadiene rubber, in HuBei ChengFeng Chemical Co., Ltd.).

The epoxy asphalt prepared by the above components is epoxy asphalt 5-1, epoxy asphalt epoxy asphalt 5-3, epoxy asphalt 5-4, epoxy asphalt 5-5, epoxy asphalt 5-6, epoxy asphalt 5-7 and epoxy asphalt 5-8, respectively, and the property data are as shown in Table 10.

TABLE 10

Property Data Table of Experimental Groups 5-1 to 5-8

| Category | Elongation at break/% (−10° C.) | Tensile strength/MPa (−10° C.) | Time of viscosity to reach 1000 mPa · s/min |
|---|---|---|---|
| Experimental Group 5-1 | 20.12 | 6.21 | 35 |
| Experimental Group 5-2 | 15.52 | 5.38 | 40 |
| Experimental Group 5-3 | — | — | — |
| Experimental Group 5-4 | — | — | — |
| Experimental Group 5-5 | 25 | 7.35 | 38 |
| Experimental Group 5-6 | 19.75 | 6.53 | 120 |
| Experimental Group 5-7 | 35.73 | 8.23 | 38 |
| Experimental Group 5-8 | 39.03 | 9.32 | 160 |

The following conclusions can be drawn by combining the above data.

(1) Compared with the tensile property of the epoxy asphalts in Comparative Examples 1 to 4 at the temperature of −10° C. and the tensile property at the temperature of 23° C., the tensile properties of the epoxy asphalt in Examples 1 to 4 generally show that the tensile strength is slightly enhanced, but the elongation at break is greatly reduced, which also reflects the phenomenon of poor low-temperature flexibility of the epoxy asphalt.

(2) The tensile strength and elongation at break of the epoxy asphalt of the present disclosure in Examples 1 to 4 at the normal temperature and the low temperature are far better than the commonly used China-made epoxy asphalt-1 in Comparative example 1, and are far higher than the requirements of "Technical Specification for Design and Construction of Highway Steel Bridge Deck Pavement" (JTGT 3364-02-2019) that the tensile strength is not lower than 2.0 MPa and the elongation at break is not lower than 100%.

(3) Although the commonly used China-made epoxy asphalt-2 in Comparative Example 2 has a higher tensile strength at the normal temperature and the low temperature than the epoxy asphalt of the present disclosure, the commonly used China-made epoxy asphalt-2 has a poorer elongation at break, does not satisfy the specification requirements, and particularly shows an extremely poor low-temperature flexibility at the temperature of −10° C.

(4) The tensile strengths of the epoxy asphalt in Examples 1 to 4 are similar to that of the Japanese epoxy asphalt in Comparative Example 3 at 23° C., and the elongation at break is slightly lower than that of the Japanese epoxy asphalt; however, the lowest elongation at break in the epoxy asphalt of the present disclosure under a low-temperature condition (−10° C.) is 39.03% in Example 2, but still higher than 31.48% in Japanese epoxy asphalt, and all satisfy the specification requirements, and show a more excellent low-temperature flexibility;

(5) Although the elongation at break of the American epoxy asphalt is slightly larger than that of the epoxy asphalt of the present disclosure at the normal temperature (23° C.) and the low temperature (−10° C.), the preparation process of the American epoxy asphalt adopts a warm mixing process, the tensile strength is much lower than that of the epoxy asphalt of the present disclosure, the price is the most expensive, and the cost pert of the epoxy asphalt of the present disclosure is saved by approximately 80 percent compared with that of the American epoxy asphalt on average.

(6) Tables 2 to 9 show the economic costs (neglecting labor costs) of the epoxy asphalts of the present disclosure in Examples 1 to 4 and the China-made epoxy asphalt-1, the China-made epoxy asphalt-2, the Japanese epoxy asphalt and the American epoxy asphalt in Comparative Examples 1 to 4. It can be seen that the low-temperature property of the epoxy asphalt is better than that of the Japanese epoxy asphalt, and the cost per t is saved by approximately 79 percent on average; the low-temperature flexibility of the epoxy asphalt in the present disclosure is slightly lower than that of American epoxy asphalt, but the cost per t is saved by approximately 80 percent compared with that of the American epoxy asphalt on average; the normal temperature and low-temperature property of the epoxy asphalt of the present disclosure are obviously better than that of Chinese epoxy asphalt-1 and Chinese epoxy asphalt-2, the economic cost is similar to that of Chinese epoxy asphalt-1, and the cost per t is saved by approximately 39 percent compared with China-made epoxy asphalt-2 on average. The epoxy asphalt of the present disclosure shows an excellent economy on the basis of an excellent property.

(7) Experimental Groups 5-1 to 5-8 are examples characterizing the synergistic effect of the components of the present disclosure and the property data, as shown in Table 10. It can be analyzed from Table 10 that: when the component B only adopts an active curing agent, the prepared epoxy asphalt 5-1 has a relatively poor low-temperature property, the time for the viscosity to reach 1000 mPa·s is too short, and the epoxy asphalt is not suitable for construction; when the component B only adopts the modifying agent, the prepared epoxy asphalt 5-1 has poorer low-temperature property, and the elongation at break at −10° C. is only 15.51%; when the component B only adopts titanate coupling agent or reversible additive, the curing reaction cannot be completed; when the component B adopts the combination of the active curing agent with the modifying agent, and the combination of the titanate coupling agent and the reversible change additive, respectively, the property of the prepared epoxy asphalt is improved in some aspects, but the epoxy asphalt still has defects; when the component B adopts all of the four materials, the prepared epoxy asphalt 5-8 has excellent low-temperature property, flexibility and viscosity property.

It can be seen from the above conclusions that the epoxy asphalt prepared by the epoxy resin material of the present disclosure has the advantages of low cost, simple composition and preparation process, long construction retention time and contribution to field construction, and the prepared epoxy asphalt has an excellent tensile property, particularly has a significantly improved flexibility in a low-temperature environment, has an excellent road property, and has a great significance for promoting the development of the traffic field, reducing the production cost and improving the economic benefit.

The present disclosure provides an idea and method of an economical epoxy resin material for epoxy asphalt with low-temperature resistance and high flexibility as well as a preparation method thereof. There are a plurality of methods and ways for achieving the technical solutions, and the above descriptions are only preferred embodiments of the present disclosure. It should be noted that, for those skilled in the art, a plurality of improvements and modifications can be made without departing from the principles of the present disclosure, and these improvements and modifications should be regarded as the protection scope of the present disclosure. All of the components not specified in this embodiment can be implemented by the prior art.

What is claimed is:

1. An economical epoxy resin material for epoxy asphalt with low-temperature resistance and high flexibility, consisting of a Component A and a Component B by a mass fraction,
    wherein the Component A is 60 parts of an epoxy resin main agent;
    wherein the Component B consists of following components:
    0.4 parts to 1.6 parts of a modifying agent,
    31 parts to 36.5 parts of an active curing agent,
    0.5 parts to 1.5 parts of a titanate coupling agent, and
    1.6 parts to 6.4 parts of a reversible deformation additive,
    the epoxy resin main agent is diphenol propane glycidyl ether resin;
    the modifying agent is 1-piperazine ethylamine;
    the active curing agent is 1-amino-9-octadecene;
    the titanate coupling agent is selected from any one or a mixture of more than two from isopropyl triisostearoyl titanate, isopropyl trilauryl titanate, isopropyl tris (dodecylbenzenesulfonyl) titanate and isopropyl isostearoyl diacryloyl titanate; and
    the reversible deformation additive is acrylonitrile-butadiene rubber.

2. A method for preparing the economical epoxy resin material for epoxy asphalt with low-temperature resistance and high flexibility according to claim 1, comprising following steps:
    (1) mixing the active curing agent, the modifying agent, the titanate coupling agent and the reversible deformation additive, preheating the mixture to 60° C., and stirring and mixing the mixture to obtain the component B; and
    (2) mixing the component B obtained in Step (1) with the component A and stirring the mixture for 5 minutes at a temperature of 60±5° C. to obtain the epoxy resin material.

3. The method for preparing the economical epoxy resin material for epoxy asphalt with low-temperature resistance and high flexibility according to claim 2, wherein in Step (1), a stirring temperature for preparing the component B is 80±5° C., and a stirring time is 3 hours.

4. An epoxy asphalt for paving highway pavement, concrete bridge pavement, and steel bridge pavement, the epoxy asphalt comprising the epoxy resin material according to claim 1.

5. A method of using the epoxy resin material according to claim 1 to prepare an epoxy asphalt for paving highway pavement, concrete bridge pavement, and steel bridge pavement, the method, comprising following steps:
    S1: evenly mixing Components A and B in the epoxy resin material;
    S2: taking 100 parts of the epoxy resin material obtained by mixing in Step S1 and adding the epoxy resin material into 100 parts of a matrix asphalt, and stirring the mixture at a temperature of 160±10° C. for 5 minutes to obtain the epoxy asphalt;
    S3: mixing the epoxy asphalt obtained in Step S2 with an aggregate and a mineral powder, and stirring the mixture for 1 minute to 2 minutes at a temperature of 170±10° C. to obtain an epoxy asphalt mixture; wherein a mass percent of the epoxy asphalt is 4% to 6%, and a mass percent of the aggregate and the mineral powder is 94% to 96%; and S4: spreading the epoxy asphalt mixture obtained in Step S3 on the pavement or the deck, rolling the epoxy asphalt mixture into shape, and curing the shaped epoxy asphalt mixture at a temperature of 5° C. to 50° C. for 36 hours to 96 hours.

* * * * *

UNITED STATES PATENT AND TRADEMARK OFFICE
CERTIFICATE OF CORRECTION

PATENT NO. : 12,116,478 B2
APPLICATION NO. : 18/335100
DATED : October 15, 2024
INVENTOR(S) : Sang Luo et al.

It is certified that error appears in the above-identified patent and that said Letters Patent is hereby corrected as shown below:

On the Title Page

Item (71) Applicant should read: Southeast University, Jiangsu (CN)

Item (72) Inventors should read: Sang Luo, Jiangsu (CN); Jing Hu, Jiangsu (CN)

Signed and Sealed this
Twenty-sixth Day of November, 2024

Katherine Kelly Vidal
*Director of the United States Patent and Trademark Office*